(12) United States Patent
Pozzato et al.

(10) Patent No.: US 12,486,500 B2
(45) Date of Patent: Dec. 2, 2025

(54) METHOD FOR STIMULATING THE GENE EXPRESSION IN ENDOMETRIAL CELLS

(71) Applicant: Telea Medical Group S.R.L., Sandrigo (IT)

(72) Inventors: Gianantonio Pozzato, Vicenza (IT); Alessandro Pozzato, Sandrigo (IT)

(73) Assignee: Telea Medical Group S.R.L., Sandrigo (IT)

( * ) Notice: Subject to any disclaimer, the term of this patent is extended or adjusted under 35 U.S.C. 154(b) by 552 days.

(21) Appl. No.: 16/984,969

(22) Filed: Aug. 4, 2020

(65) Prior Publication Data
US 2021/0047631 A1    Feb. 18, 2021

(30) Foreign Application Priority Data

Aug. 5, 2019  (IT) .................. 102019000013992

(51) Int. Cl.
| | |
|---|---|
| *C12N 13/00* | (2006.01) |
| *A61B 17/425* | (2006.01) |
| *A61N 1/36* | (2006.01) |
| *C12N 5/071* | (2010.01) |
| *C12N 15/67* | (2006.01) |
| *C07K 14/54* | (2006.01) |
| *C07K 14/705* | (2006.01) |

(52) U.S. Cl.
CPC ............ *C12N 13/00* (2013.01); *A61B 17/425* (2013.01); *A61N 1/36* (2013.01); *A61N 1/36034* (2017.08); *C12N 5/0682* (2013.01); *C12N 15/67* (2013.01); *C07K 14/54* (2013.01); *C07K 14/705* (2013.01)

(58) Field of Classification Search
CPC ..................................................... C12N 13/00
See application file for complete search history.

(56) References Cited

U.S. PATENT DOCUMENTS

| | | |
|---|---|---|
| 2002/0177574 A1 | 11/2002 | Tayler |
| 2018/0214068 A1 | 8/2018 | Munne et al. |

FOREIGN PATENT DOCUMENTS

| | | |
|---|---|---|
| FR | 2 679 456 A1 | 1/1993 |
| WO | 95/13821 A1 | 5/1995 |
| WO | 2004/108211 A1 | 12/2001 |

OTHER PUBLICATIONS

Shah et al., 2003, Reproduction, vol. 126, pp. 13-25 (Year: 2003).*
Natadisastra et al. (2018, Indones. J. Obstet. Gynecol., vol. 6-2, pp. 110-113) (Year: 2018).*
Da Broi et al. (2017, JBRA Assisted Reproduction, vol. 21, pp. 196-202) (Year: 2017).*
Novotny et al. (2009, Folia Biologica, vol. 55, pp. 92-97) (Year: 2009).*
Chen et al., 2019, Biomaterial Res., vol. 23:25, pp. 1-12 (Year: 2019).*
Yahaya et al. (2020, Egyptian J. Medical Human Genetics, vol. 21:46, pp. 1-17) (Year: 2020).*
Italian Search Report dated Mar. 17, 2020, issued in Italian Application No. 102019000013992, filed Aug. 5, 2019.
Madafeiton Ma Bodombossou-Djobo et al., *Neuromuscular Electrical Stimulation and Biofeedback Therapy may Improve Endometrial Growth for Patients with Thin Endometrium During Frozen-Thawed Embryo Transfer: A Preliminary Report*, Reproductive Biology and Endocrinology, Biomed Central Ltd., GB, vol. 9, No. 1, Aug. 25, 2011, p. 122, XP021109164.
Qu Fan et al., *Use of Electroacupuncture and Transcutaneous Electrical Acupoint Stimulation in Reproductive Medicine: A Group Consensus*, Science B: International Biomedicine & Biotechnology, Zhejiang University Press, CN, vol. 18, No. 3, Apr. 20, 2017, pp. 186-193, XP036215643.
Wenhui Liu et al., *Effect of 935-MHz Phone-Simulating Electromagnetic Radiation on Endometrial Glandular Cells During Mouse Embryo Implantation*, Journal of Huazhong University of Science and Technology, vol. 32, No. 5, Oct. 18, 2012, pp. 755-759, XP035126394.

* cited by examiner

Primary Examiner — Anoop K Singh
Assistant Examiner — David A Montanari
(74) Attorney, Agent, or Firm — Workman Nydegger

(57) ABSTRACT

An in-vitro method for stimulating the gene expression of at least one of XOXA10, LIF, ITGB3, XOXA11 and ITGAV genes in endometrial cells comprising applying on such endometrial cells electric current waves having a sinusoidal waveform with a fundamental frequency higher than 2 MHz, preferably of about 4 MHz, for a predefined amount of time.

5 Claims, 3 Drawing Sheets
Specification includes a Sequence Listing.

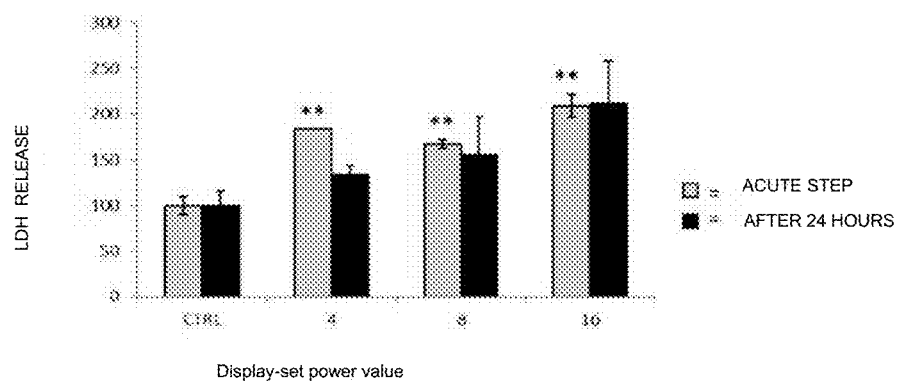
Fig. 1
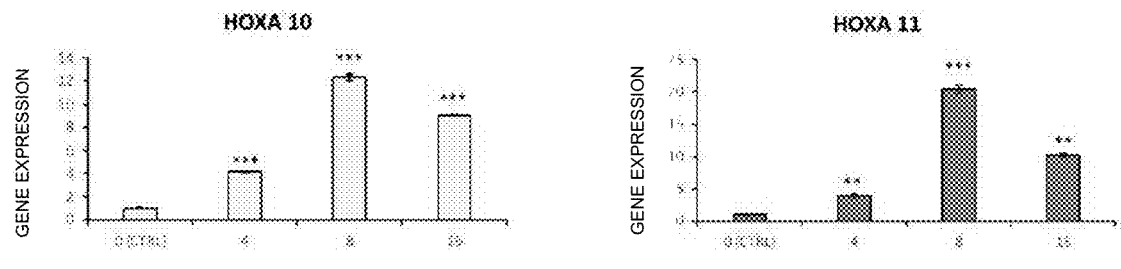
Fig. 2a  Fig. 2b
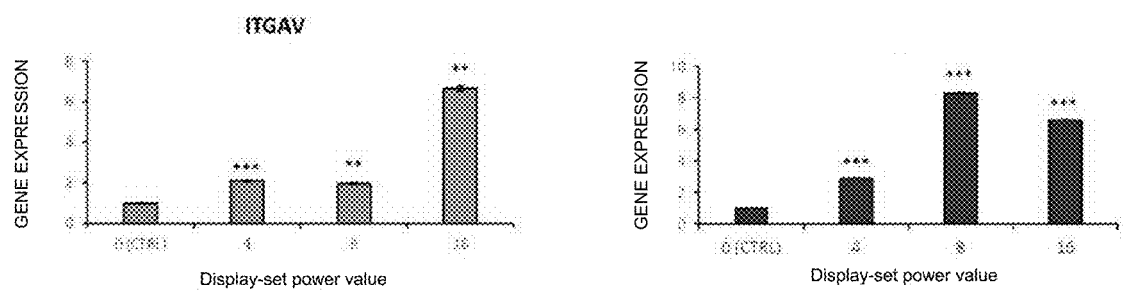
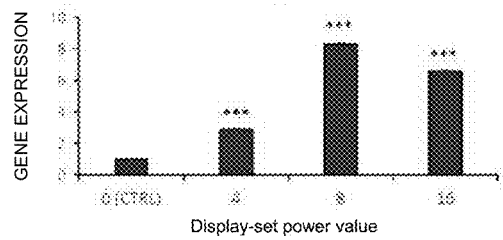
Fig. 2c  Fig. 2d
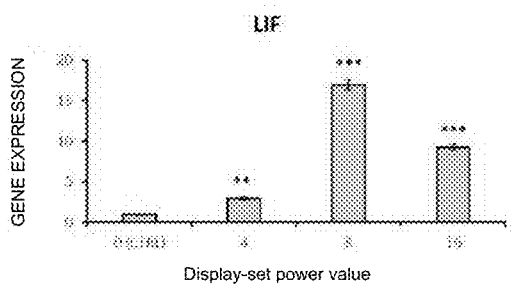
Fig. 2e

METHOD FOR STIMULATING THE GENE EXPRESSION IN ENDOMETRIAL CELLS

REFERENCE TO A SEQUENCE LISTING SUBMITTED VIA EFS-WEB

The content of the ASCII text file of the sequence listing named "19720-103_2020-10-09_Sequence-Listing_ST25," which is 2.66 kb in size, was created on Oct. 9, 2020, and is electronically submitted via EFS-Web here with the application and is incorporated herein by reference in its entirety.

CROSS-REFERENCE TO RELATED APPLICATIONS

This application claims priority to Italian Application No. 102019000013992, filed Aug. 5, 2019, which is incorporated herein by specific reference.

BACKGROUND OF THE INVENTION

1. The Field of the Invention

The invention relates to a method for stimulating the gene expression in endometrial cells, in particular a method for stimulating the gene expression in such cells of at least one of XOXA10, LIF, ITGB3, XOXA11 and ITGAV genes.

The invention further relates to a process for increasing the likelihood of conception in a healthy subject.

2. The Relevant Technology

It is known that in order to obtain an embryo implantation different molecules are required to cooperate and interact with each other to ensure the fertilized egg cell nidation and the embryo progression during the first steps of pregnancy.

In particular, XOXA10, LIF, ITGB3, XOXA11 and ITGAV are genes which play an important role in the process of embryo nidation and progression, in fact they encode for classes of proteins involved in developing and regulating the aforesaid processes in embryonic cells.

More specifically, Homebox 10 (HOXA10) and Homebox 11 (HOXA11) genes encode for DNA transcription factors which regulate the gene expression, morphogenesis and differentiation of the embryo, whose under-expression is known to provide infertility in murine models.

The LIF gene instead encodes for one of the most important oestrogen hormone mediators, the leukaemia inhibitory factor, that is crucial for uterus receptivity and implantation. In fact, such mediator associates with its LIFR receptor in the endometrium uterine glandular epithelium and activates the AK/STAT3, MAPK/ERG molecular pathways and phosphatidylinositol-3 phosphate kinase PI3K which regulate the biological response of different steps of the cell cycle.

Furthermore, also transmembrane glycoproteins known as integrins play an important role in cell-cell and cell-matrix interactions in several physiological processes.

Several studies proved that transmembrane glycoproteins known as integrins also play an important role in cell-cell and cell-matrix interactions in several physiological processes.

In particular, β3 and α5 integrins, respectively encoded by ITGB3 and ITGAV genes, are involved in embryo development as they serve as receptors for osteopontin, an acid glycoprotein whose expression both in the endometrium and in trophoblasts is related to the progesterone hormone levels. Some studies also highlighted that low levels of such integrins can be found in healthy female subjects who, however, are inexplicably infertile.

Despite the existence of several experimental and medical approaches for stimulating embryonal nidation processes, there is still need to develop new methods to stimulate the embryonal development, in particular for stimulating embryonal development in healthy subjects, i.e., not affected by reproductive system diseases, who are in any case infertile according to the American Fertility Society indicating "infertility as failure to establish a clinical pregnancy after twelve months of regular, unprotected sexual intercourse".

Generally, couples defined as infertile according to the mentioned definition, undergo reproductive functionality tests based on standard medical guidelines which comprise seminal fluid test, ovulation and ovarian reserve assessment,
    hysterosalpingography and laparoscopy to detect possible abnormalities. When the aforesaid tests do not detect any kind of abnormality or disease, infertility is defined as unexplainable or idiopathic. The subject is to be considered as healthy in that not affected by any such disease to make him/her infertile, however, the subject is in any case infertile.

Currently, in such healthy infertile subjects the processes used to increase likelihood of conception mainly concern medically assisted procreation MAP methods.

A known MAP method is artificial insemination by which the donor's seminal fluid is introduced by the consultant into the receiver's vagina, cervix or uterus.

A further type of MAP method is the so called in-vitro fertilization wherein the woman's egg cells are collected and fertilized with male seminal fluid outside the body and, once the oocyte is fertilized, if an embryo develops, the latter is transferred into the uterus.

Further, MAP methods comprise the in-vitro intra-cytoplasmatic injection of spermatozoa, a procedure wherein a single spermatozoon is directly injected inside the oocyte cytoplasm and once the oocyte is fertilized, the developing embryo is transferred into the uterus.

Still another known MAP method consists in inducing ovulation, i.e., pharmaceutically stimulating ovulation in case of failure (anovulation) or reduced (oligoovulation) production of oocytes.

It is clear that the mentioned MAP methods are physically invasive treatments, especially for the woman who, besides undergoing possible implantations of fertilized embryos, is also usually submitted to hormone stimulation protocols before the egg cells are collected.

Equally important, such MAP methods, requiring highly qualified staff, specialized medical premises and/or drugs, are particularly expensive.

Not least, despite a correct lifestyle and a healthy clinical situation, with no manifest disease, many couples of healthy subjects undergoing the mentioned methods fail in any case to conceive a biological child.

In fact, the yield, in terms of children born per medically assisted procreation cycle, is limited to about 30% of couples.

It is thus stressed the need to develop alternative approaches to increase the likelihood of conception in healthy infertile couples.

Description of the Invention

The object of the present invention is to implement a method for stimulating the fertilized egg cell nidation process and embryo progression into the endometrium cells that overcome the limitations of the known methods.

In particular, the object of the invention is to carry out such method with endometrial in-vitro and in-vivo cells.

Furthermore, it is an object of the present invention that such a method is not invasive.

Particularly, it is an object of the invention to carry out a method increasing the likelihood of conception in healthy infertile female subjects.

Another object of the method of the invention is to carry out a method that is easy to use and with no side and undesired effect on the body undergoing such a treatment.

A not least object is that such method is carried out by a cost-effective and efficient device.

The aforesaid objects are reached by an in-vitro method for stimulating the gene expression of at least one of XOXA10, LIF, ITGB3, XOXA11 and ITGAV genes in endometrial cells, as defined in the main claim.

In particular, the method of the invention provides to apply on in-vitro endometrial cells, for a predefined amount of time, electric current waves having a sinusoidal waveform with a fundamental frequency higher than 2 MHz, preferably of about 4 MHz.

According to the method of the invention, the sinusoidal wavelength is distorted due to the presence of harmonics, preferably at least of the second and third order.

Further, according to the method of the invention, the predefined amount of time is in the range between 10 and 60 minutes and the application is repeated n times a day for m days, wherein n and m are each an integer, preferably between 1 and 10.

According to a particular embodiment of the method of the invention, endometrial cells are cells belonging to a mammalian endometrium, preferably cells belonging to an endometrium bioptic material of human origin.

Advantageously, the method of the invention allows to stimulate the gene expression of all XOXA10, LIF, ITGB3, XOXA11 and ITGAV genes.

Part of the present invention is also a process for increasing the likelihood of conception in a healthy infertile subject by means of stimulating the gene expression of at least one of XOXA10, LIF, ITGB3, XOXA11 and ITGAV genes in the endometrial cells, comprising the following steps:

connecting an electronic device adapted to generate electric current waves having a sinusoidal waveform with a fundamental frequency higher than 2 MHz, preferably of about 4 MHz, to one or more electrodes;

applying at least one of such electrodes in correspondence or in proximity of the endometrium of the aforesaid subject;

activating said electronic device such as to transfer the current waves to such electrode and keeping the device activated for a predetermined amount of time, preferably between 10 and 60 minutes;

deactivating the electronic device and taking the electrode away from the subject.

Applying such at least an electrode and activating it is further preferably repeated n times a day for m days, wherein n is an integer preferably between 1 and 5 and m is an integer, preferably m is greater than 2, more preferably m is greater than 4, still more preferably m is between 6 and 16.

The term "subject" as used in the present description includes all female mammalians, human and not human.

In the present invention, the preferred subject is a human.

Furthermore, the term "healthy" means a subject not affected by a disease of the known-type such to result in clinical infertility.

Furthermore, the term "infertile" refers to the American Fertility Society definition indicating infertility as the failure to establish a clinical pregnancy after twelve months of regular, unprotected sexual intercourse".

In the process for increasing the likelihood of conception of a healthy infertile subject, the electric current wave has a sinusoidal waveshape that is distorted due to the presence of harmonics at least of the second and the third order.

Further characteristics and advantages of the method of the invention will be clear to a person skilled in the art from the following description of a preferred embodiment of the invention provided for exemplary though non-limiting purposes.

BRIEF DESCRIPTION OF THE FIGURES

FIG. 1 reports the percentage increase of the lactate dehydrogenase enzyme (LDH) in the culture medium of Ishikawa cells treated with the method of the invention compared to control cells (CTRL) at a display-set power level of 4, 8 e 16, in the acute step and after 24 hours from stimulation (average±standard deviation; **=$p<0.01$);

FIGS. 2a, 2b, 2c, 2d and 2e show gene expression values respectively of HOXA10, XOXA11, ITGAV, ITGB3 and LIF genes in Ishikawa cells treated at a display-set power level of 4, 8 and 16 with the method of the invention compared to non-treated control cells (CTRL) (average±standard deviation; =$p<0.01$; *=$p<0.001$);

DETAILED DESCRIPTION OF THE INVENTION

Figure 3:
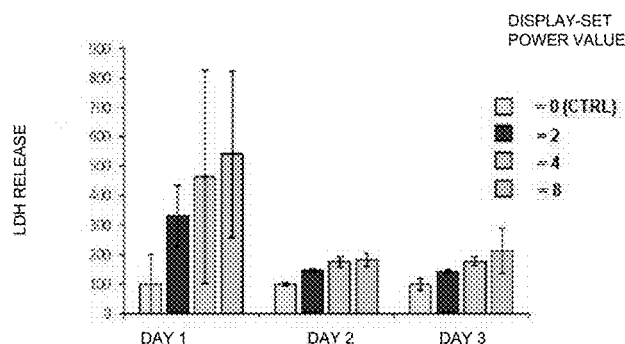
FIG. 3 reports the percentage increase of the lactate dehydrogenase enzyme (LDH) in the culture medium of Ishikawa cells treated with the method of the invention at a display-set power level of 2, 4, and 8 for three consecutive days compared to control cells (CTRL), after 24 hours from stimulation (average±standard deviation)

As previously indicated, the present invention relates to a method for stimulating the gene expression of at least one of XOXA10, LIF, ITGB3, XOXA11 and ITGAV genes in in-vitro endometrial cells.

The term endometrial cells refers to cells deriving from mammalian endometrial tissue.

In particular, such cells comprise cells from human endometrial adenocarcinoma cell line, commercially known as Ishikawa cells, and mammalian endometrial cells present in bioptic material.

Ishikawa cells are well known in the art and commercially available in several cell banks as ATCC and ECACC, therefore they will not be further discussed as they are well known by the skilled in the art.

The mammalian endometrial cells from bioptic tissue of the present invention can be obtained either from endometrium biopsies from laboratory animals, such as in particular mice, rats, rabbits and primates and from human endometrium bioptic samples, as shown in the following examples.

In particular, in the example 2, bioptic-derivation endometrial cells treated with the method of the invention were obtained from six samples of human endometrial bioptic material obtained from six female subjects submitted to biopsy during a periodic screening test due to a previous myoma, endometriosis or menometrorrhagia, upon undersigned informed consent.

Concerning the in-vitro method of the invention, it provides to apply on endometrial cells electric current waves having a sinusoidal waveshape with a fundamental frequency higher than 2 Mhz for a predefined amount of time.

The use of a frequency of about 4 Mhz resulted to be particularly advantageous.

Advantageously, as will be better visible from the following examples, applying such electric current waves allows to obtain an increase in gene expression of all the aforesaid genes which, as previously noted, are involved in the embryonal nidation processes during the first steps of pregnancy, thus promoting a cooperation between the various proteic pathways involved in embryonal development in the first weeks of a pregnancy.

Furthermore, advantageously, gene stimulation by the method of the invention is not associated to a cell degradation deriving from the medium temperature increase, as it can be seen from the results of the test on the presence of lactate dehydrogenase enzyme.

Lactate dehydrogenase enzyme is in fact an enzyme released from the cell into the extra-cellular environment following an acute damage to the cell and its quantification in the medium indicates cell damage.

According to the method of the invention, the sinusoidal wavelength is distorted due to the presence of harmonics, preferably the presence of harmonics at least of the second and the third order.

Advantageously, the combination of such frequencies and harmonics makes it possible that energy transmitted to cells is converted almost exclusively into potential energy and not into kinetic energy, preventing development of high temperatures.

Furtherly, an induced electrical field is formed on the cell membrane with resulting alteration in the transmembrane potential which implies activating or deactivating membrane ion channels and modulating the phosphorilated proteic domain activity with a voltage sensor activity.

The best results in terms of gene expression stimulation are obtained when the predefined time is between 10 and 60 minutes, preferably about 20-30 minutes, and such electric current waves are applied n times a day for m days, wherein n and m are each an integer, preferably an integer between 1 and 10.

In particular, according to the hereinafter reported examples, applying current waves once a day for three consecutive days resulted particularly advantageous.

It must not be excluded, however, that according to variant embodiments of the method of the invention, such predefined amount of time and/or such number of applications have a value that differs from what indicated hereinbefore.

More specifically the method of the invention provides to apply to in-vitro endometrial cells one or more electrodes connected to an electronic device configured to generate the aforesaid electric current waves.

Such electronic device preferably comprises a rectifier circuit supplied by the grid voltage providing direct voltage, preferably stabilized, to a radiofrequency circuit, and a radiofrequency circuit comprising at least an electronic switch supplied by the voltage and driven by a drive circuit.

More in detail, the radio-frequency circuit has an outlet current wave having a frequency basically corresponding to about 4 Mhz and distorted sinusoidal shape due to the presence of harmonics at least of the second and third order.

Such current wave further circulates in a broadband resonant circuit on the frequency of the fundamental wave of the distorted sinusoidal shape.

The use of the electronic device disclosed in document U.S. Pat. No. 8,457,751 is particularly preferred.

Advantageously, the results obtained by the in-vitro method of the invention can be obtained also in-vivo on animals, in particular on mammalians.

It is particularly preferred to apply such method to healthy infertile human subjects according to the previously provided definition.

Part of the present invention is also a process for increasing the likelihood of conception in a healthy infertile subject by means of stimulating the gene expression of at least one of XOXA10, LIF, ITGB3, XOXA11 and ITGAV genes in the endometrial cells, comprising the following steps:
  connecting an electronic device adapted to generate electric current waves having a sinusoidal waveform with a fundamental frequency higher than 2 Mhz to one or more electrodes;
  applying at least one of such electrodes in correspondence or in proximity of the endometrium of the healthy infertile subject;
  activating the electronic device such as to transfer said current waves to such an electrode and keeping the device activated for a predetermined amount of time;
  deactivating the electronic device and taking the electrode away from the subject.

The electronic device implementing the above mentioned process is the same electronic device used in the in-vitro method of the present invention, which furthermore comprises one or more electrodes having such a shape as to be applied in correspondence or in the vicinity of the subject endometrium.

Preferably such electrodes can have a strip shape or a basically laminar shape and are applicable to adhere to the skin of the subject or, further, such electrodes can have the shape of a probe for vaginal application.

In case the electrodes used in the process of the invention have a laminar shape, they are basically flexible such to easily follow the shape of the skin surface and, furthermore, they are also preferably provided with an adhesive substance which eases keeping them in contact with the skin while applying waveshape generated by the electronic device.

Even in the process to increase the likelihood of conception of the present invention, the wave applied to the electrodes is a sinusoidal wave having as fundamental frequency a frequency higher than 2 Mhz, preferably of about 4 Mhz such to obtain the above mentioned advantages.

Moreover, the sinusoidal waveshape applied to electrodes is distorted due to the presence of harmonics, preferably harmonics at least of the second and third order.

The effect of applying such waveshapes in correspondence or in the vicinity of the area where the subject endometrium is located is to act on the endometrial cells, such to stimulate the gene expression of all the mentioned genes, involved in the process of embryo nidation and progression in the first steps of a pregnancy, increasing the likelihood of conception.

From experiments carried out, it was observed an increase in the likelihood of conception in a healthy infertile subject when the aforesaid current waves are applied to electrodes and consequently to the subject based on a predefined amount of time between 10 and 60 minutes and wherein such application is repeated n times a day for m days, wherein n is an integer, preferably between 1 and 5, and m is an integer, preferably higher than 2, more preferably higher than 4, still more preferably between 6 and 16.

It must not be excluded however that, according to variant embodiments of the process of the invention, such predefined amount of time and/or the number of applications have values that differ from what indicated.

It must be pointed out that the term "subject" includes all mammalians, human and non-human, however, the preferred subject is the human.

Advantageously, it was found that by applying the method of the invention, upon undersigned informed consent, for 20 minutes, once a day for 2-3 days a week for 4-5 consecutive weeks, seven women aged 25 to 43 who had failed to conceive after twelve months of regular, unprotected sexual intercourses, succeeded in naturally conceiving a child within a year following the last application of the process of the invention, i.e., without undergoing MAP treatments.

Other aspects and advantages of the present invention will appear when reading the following examples, which are to be considered as illustrative and non-limiting.

EXAMPLES

Example 1

Ishikawa Cell Cultures
1.1 Cell Growth
Cell-line Ishikawa cells (kindly provided by Professor M. Maggiolini, Department of Pharmacy, Health and Nutritional Sciences, University of Calabria) were grown in a minimal essential medium (MEM) added with 5% fetal bovine serum (FBS), 1% penicillin/streptomycin, 1% amphotericin B solution, 1% non-essential amino acids (NEAA) and 2 mM L-Glutamine. Cells were grown in a 6-cm Petri dish and maintained in an infertile incubator at 37° C. and 5% $CO_2$.
1.2 Single Treatment with Electric Current Waves having a Sinusoidal Wavelength
Petri dishes containing the Ishikawa endometrial cultures maintained in the medium according to what reported in the example 1.1 were connected to two hot-sterilized stainless steel electrodes that were then connected to an electronic device configured to generate the electric current waves of the method of the invention. The electronic device used was Rexon-age2 from Telea Electronic Engineering, which generates a current wave with a frequency between 1-64 Mhz and wherein the desired power values and application time are display-set operating parameters.

It must be noted that the display-set power value may not match with the real power value applied to the cells as it depends on various external parameters, such as for example the medium impedance.

The change in temperature during application of the current waves was monitored by infrared thermography (Handy Thermo TVS-200 Nippon Avionics Co., Ltd) and analysed using PE Professional (Nippon Avionics Co., Ltd.).

Ishikawa cells were stimulated by applying electric current waves having a distorted sinusoidal waveshape due to the presence of harmonics and with a fundamental frequency of 4 Mhz and power value set from 0 (control cells) to 16 for a predefined amount of time of 20 minutes at room temperature and in sterility conditions.

Immediately after stimulation, the medium was taken, centrifuged and stored at −80° C. for LDH acute release assessment.

New medium was then added to Petri dishes and cells were maintained at 37° C. in 5% $CO_2$ for additional 24 hours.

After 24 h, the medium was taken, centrifuged and stored at −80° C. to quantify LDH delayed release.

Cells were furthermore collected for gene expression analysis.
1.3 Analysis of Cell Lysis from Single Treatment
Cell lysis was assessed by quantifying the lactate dehydrogenase enzyme (LDH) with LDH Cytotoxicity Assay (Pierce-Life Technologies), following the protocol provided by the production company, in the medium collected in the acute step and after 24 hours from current wave stimulation according to what reported in the example 1.2.

In operative terms, the cell culture medium was transferred into 15-ml Falcon tubes (Becton Dickinson) which were centrifuged for 10 minutes at 2500 rpm. 2 ml of medium was then stored at −80° C. until use thereof.

For LDH analysis, 50 µl of reactant was added to 50 µl of the medium to be analysed and incubated at room temperature for 60 minutes. The reaction was then stopped by adding acetic acid and the optical density at 490 nm was measured.

Each analysis was performed in triplicate.

The obtained results are shown in FIG. 1 where it is shown that the greatest amount of LDH is present inside the medium collected in the acute step, i.e., immediately after the electronic device stimulation, at a set power value of 4, 8 and 16 if compared to the control cells which were not treated. The increase, however, though statistically significant, was limited and not related to the set power value.

Advantageously, the LDH levels in the cell medium collected after 24 hours from stimulation did not show variations if compared to the control cell medium, suggesting that the cell stimulation effect does not lead to cell degradation.
1.4 Gene Expression Analysis from Single Treatment
The Ishikawa cells treated according to what reported in the example 1.2 were collected for the gene expression analysis.

Total RNA was extracted from the cell pellet by RNeasy® Mini kit (QIAGEN) following the instructions provided by the producing company.

RNA was later quantified by UV-VIS NanoDrop spectrophotometer (Thermo Fisher scientific).

The corresponding c-DNA was obtained from the total RNA using SuperScript III Reverse Transcriptase. Oligodeoxyribonucleotides primers with random base sequences (esamer random) were used as described by the producer. c-DNA was then amplified by PCR Real-Time StepOnePlus™ (Applied Biosystem, Thermo Fisher Scientific).

The PCR reaction was carried out in a MicroAmp™ Fast Optical 96-Well Reaction Plate, with 0.1 mL-volume well (Applied biosystem, Thermo Fisher). The total volume of reaction was of 10 µL containing: 2 µL of cDNA (corresponding to 20 ng), 5 µL of 2× Power SYBR Green PCR Master mix, 1 µL of forward primer and 1 µL of reverse primer. Primers were designed by Primer3 software to amplify the following genes: HOXA10, HOXA11, LIF, ITGAV, ITGB3 and GAPDH (GAPDH was used a reference gene). The sequences of the primer pairs, either forward primers and reverse primers are listed as SEQ ID NO: 1 through SEQ ID NO: 12 in the Sequence Listing submitted herewith:

SEQ ID NO: 1 is the GAPDH forward primer
SEQ ID NO: 2 is the GAPDH reverse primer
SEQ ID NO: 3 is the HOXA10 forward primer
SEQ ID NO: 4 is the HOXA10 reverse primer
SEQ ID NO: 5 is the HOXA11 forward primer
SEQ ID NO: 6 is the HOXA11 reverse primer
SEQ ID NO: 7 is the LIF forward primer
SEQ ID NO: 8 is the LIF reverse primer
SEQ ID NO: 9 is the ITGB3 forward primer
SEQ ID NO: 10 is the ITGB3 reverse primer
SEQ ID NO: 11 is the ITGAV forward primer
SEQ ID NO: 12 is the ITGAV reverse primer The amplification protocol comprised an initial denaturation step at 95° C. for 10 minutes and 40 amplification cycles each consisting in 15 seconds at 95° C., 30 seconds at 60° C. and 30 seconds at 72° C.

Quantification of the gene expression was determined using the comparative CT method (2-ΔΔCT) assessing the difference of the relative expression of a target gene in a sample if compared to the expression of the same target gene in a reference sample.

Each reaction was performed in triplicate.

The products of qRealTime-PCR were controlled by means of SYBR®

Safe DNA Gel Stain (Invitrogen, Thermo Fisher scientific), in agarose gel E-Gel® (2% pre-cast agarose gel).

The results obtained are shown in FIGS. 2a-2e.

All the analysed genes showed a significant increase in their gene expression if compared to control cells ($p<0,01$).

Such data show how the application on endometrial cells of electric current waves according to the invention stimulates the gene expression of all the analysed genes that are involved in the embryo nidation processes.

1.5 Multiple Treatment with Electric Current Waves having a Sinusoidal Wavelength Petri dishes containing the Ishikawa endometrial cultures maintained in a medium according to what reported in the example 1.1, were stimulated by means of a single application of electric current waves which was repeated for three consecutive days.

Cells are basically seeded at a density that is lower than the seeding density of cells treated by single treatment, as reported in the example 1.2, such to prevent an excessive proliferation of the cells due to prolonged culture conditions.

Every day, the Petri dishes containing the Ishikawa endometrial cultures were connected to two hot-sterilized stainless steel electrodes which were then connected to an electronic device configured to generate the electric current waves of the method of the invention (Rexon-age2, Telea Electronic Engineering) and were stimulated by applying electric current waves having a sinusoidal wavelength distorted due to the presence of harmonics and with a fundamental frequency of 4 Mhz and a set power value from 0 (control cells) to 8 for a predefined amount of time of 20 minutes at room temperature and in sterility conditions.

At the end of each application, cells were maintained at 37° C. in 5% $CO_2$ for additional 24 hours.

After 24 hours, the cell medium was collected, centrifuged and stored at −80° C. to assess release of LDH. Even the cells were collected to carry out the gene expression analysis.

1.6 Analysis of Cell Lysis from Multiple Treatment

The cell lysis of cells treated according to the example 1.5 was assessed by quantifying lactate dehydrogenase enzyme (LDH) with LDH Cytotoxicity Assay (Pierce-Life Technologies) according to what reported in the example 1.3.

The results obtained are shown in Table 3.

In order to exclude the effect due to prolonged culture conditions, LDH levels were normalised day by day on each control sample.

No significant increase was observed in cell lysis levels resulting from the treatment of the invention.

1.7 Gene Expression Analysis from Multiple Treatment

The Ishikawa cells treated according to what reported in the example 1.5 were collected for the gene expression analysis.

The analysis of the gene expression was carried out according to the protocol reported in the example 1.4.

Figure 4A:
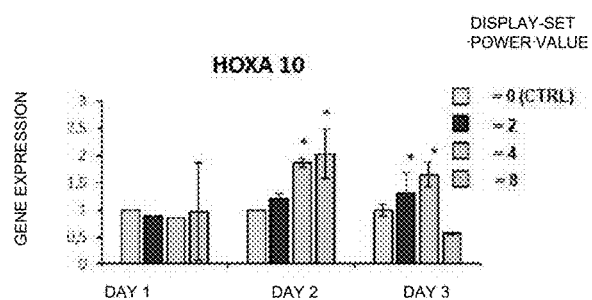
FIGS. 4a, 4b, 4c, 4d and 4e show gene expression values respectively of HOXA10, XOXA11, ITGAV, ITGB3 and LIF genes in Ishikawa cells treated after one, two or three days of current wave application according to the method of the invention at a display-set power level of 0 (control cells CTRL) 2, 4 and 8 (average±standard deviation; *=$p<0.05$; =$p<0.01$; *=$p<0.001$)
Figure 4B:
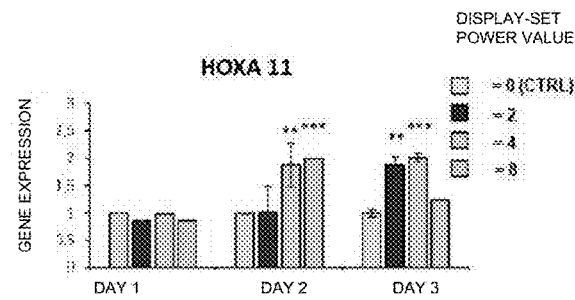
Figure 4C:
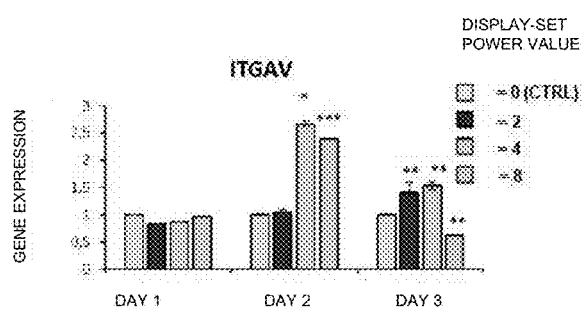
Figure 4D:
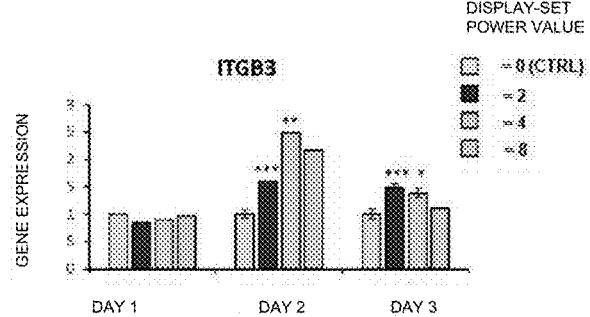
Figure 4E:
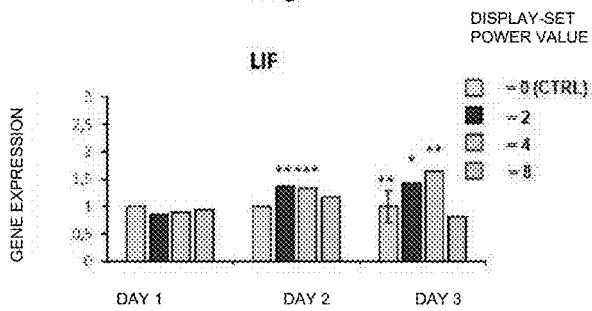

The results obtained were shown in the FIGS. 4a to 4e.

After 2 days of stimulation all the analysed genes show a significant increase in the gene expression at a set power value corresponding to 4 and 8. In particular, ITGB3 and LIF genes show a significant increase even at a set power value of 2. A general increasing trend of the gene expression is visible even after 3 days of treatment.

The results show that repeated daily applications of electric current waves according to the method of the invention stimulate the gene expression of the genes of the endometrial cells involved in the embryo nidation processes.

Furthermore, the gene expression is not associated to effects on cell vitality, as it can be noted from the results of the cell lysis.

1.8 Statistical Analysis

The statistical analysis of data was carried out with SPSS 21.0 for Windows (SPSS) programme. The Student two-tailed t-distribution test was used for comparing the two groups, before assessing the normal distribution.

For the multiple comparison the variance analysis was used (ANOVA) with Bonferroni-Holmes correction.

Example 2

Bioptic Tissue from Human Endometrium 2.1 Bioptic Tissue Collection and Culture Conditions About 10-20 mg of endometrium biotic material was taken from six female patients (average age 41,8±4,7 years-old) connected to the Department for Women's and Children's Health—The Obstetrics and Gynecology Clinic of the University of Padua, upon undersigned informed content.

The samples were collected during a periodic endoscopic screening due to a previous myoma, endometriosis or menometrorrhagia.

The samples were visually examined and the normal portion of tissue was separated from the diseased portion and maintained at low temperatures in sterile phosphate buffered saline (PBS) and rapidly transferred in laboratory.

Before being treated with the method of the invention, the samples were split in smaller-size pieces by means of an infertile scalpel and arranged in 6-cm Petri dishes containing a MEM medium added with 5% FBS, 1% penicillin/streptomycin, 1% amphotericin B solution, 1% non-essential amino acids and 2 mM of L-Glutamine.

2.2 Multiple Treatment with Electric Current Waves having a Sinusoidal Wavelength The samples of endometrial biopsy according to the example 2.1 were stimulated for three consecutive days by applying electric current waves having a sinusoidal wavelength.

On each day of stimulation, each Petri dish containing the endometrial biopsy samples was connected to two stainless steel electrodes connected to the electronic device used in the previous examples that is configured to generate the electric current waves of the method of the invention (Telea Electronic Engineering). Once connected, current waves having a sinusoidal wavelength distorted due to the presence of harmonics and a fundamental frequency of 4 Mhz were applied to each dish containing the samples. On the display of the device the desired power value of 4 was set for a predefined time of 20 minutes at room temperature and in sterility conditions.

The biopsy samples used as a control did not undergo stimulation by current waves.

After the third day of stimulation, the samples were maintained at 37° C. in 5% $CO_2$ for additional 24 hours to be later collected for gene expression analysis.

2.3 Gene Expression Analysis from Multiple Treatment

The endometrial biopsy samples treated according to what reported in the example 2.2 were collected for gene expression analysis.

The analysis of the gene expression was carried out according to the protocol reported in the example 1.4.

Figure 5A:
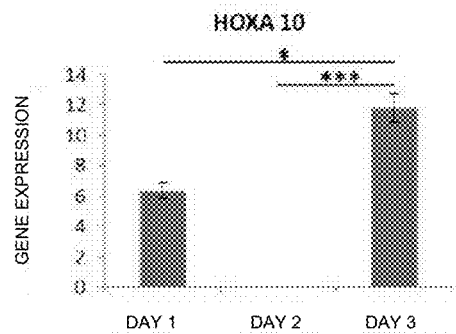
FIGS. 5a, 5b, 5c, 5d and 5e show gene expression values respectively of HOXA10, XOXA11, ITGAV, ITGB3 and LIF genes in samples of endometrial biopsies treated with the method of the invention at a display-set power level of 4 for three consecutive days, compared to non-treated control samples (CTRL), (average±standard deviation; *=$p<0.05$; =$p<0.01$; *=$p<0.001$).
Figure 5B:
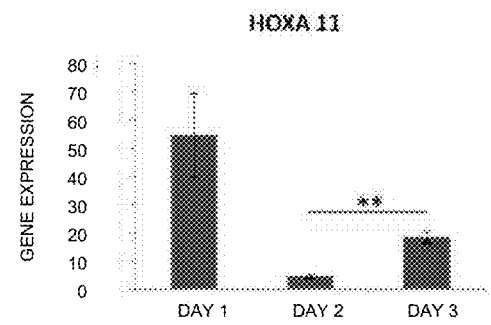
Figure 5C:
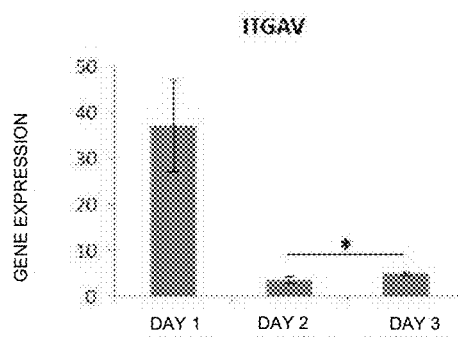
Figure 5D:
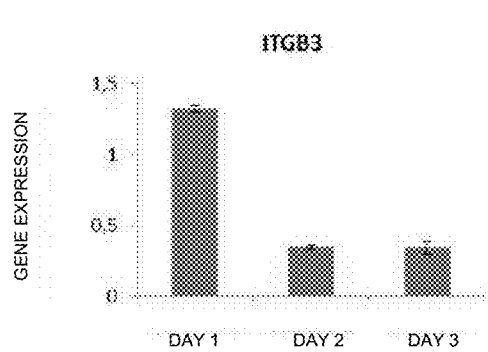
Figure 5E:
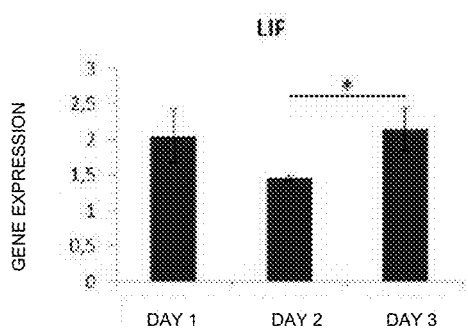

The results obtained were shown in the FIGS. 5a to 5e.

Except for ITGB3 gene, after the first day of stimulation all the monitored genes showed a reduction in their expression. Such a reduction can be related to the transfer of tissue from its natural environment to dish growth, in fact already from the second day of stimulation HOXA10, HOXA11, ITGAV and ITGB3 genes showed a significant increase in their gene expression if compared to the same gene on day 1.

Such results show unequivocally how the stimulation of endometrial tissue with electric current waves stimulates the gene expression of genes involved in the embryo nidation processes and therefore in the pregnancy development.

Based on the above the method for stimulating the gene expression of at least one of XOXA10, LIF, ITGB3, XOXA11 and ITGAV genes in endometrial cells of the invention reaches all the pre-set objects.

In particular, the object of implementing a method for stimulating the embryo nidation and progression process in the endometrial cells overcoming the limits of the well-known methods is reached.

Furthermore, the method of the invention can be carried out either with in-vitro endometrial cells and with in-vivo endometrial cells.

Furtherly, the method of the invention is not of the invasive type.

Further, the method of the invention increases the likelihood of conception in healthy infertile female subjects.

In addition, the method of the invention can be easily applied and does not have any undesired side effects on the body undergoing such treatment.

Not least, the object is reached in that the method of the invention is realized by means of a cheap and effective device.

---

The invention claimed is:

1. An in vitro process for increasing expression of a gene in endometrial cells, comprising the steps of:
   contacting a culture of endometrial cells with electrodes and applying electric current waves having a sinusoidal waveform having a fundamental frequency higher than 2 MHz to about 4 MHz for a predetermined amount of time; and
   assaying the contacted cells for the expression of a gene, wherein the gene is selected from the group consisting of HOXA10, LIF, ITGB3, HOXA11, and ITGAV, and wherein expression of the gene is increased in response to the electric current waves applied to the endometrial cells.

2. The process according to claim 1, wherein said sinusoidal wave is distorted due to the presence of harmonics.

3. The process according to claim 1, wherein said predetermined amount of time is comprised between 10 and 60 minutes and said application is repeated n times a day for m days, wherein n is an integer between 1 and 5 and m is an integer greater than 2.

4. The process according to claim 3, wherein m is an integer greater than 4.

5. The process according to claim 2, wherein said harmonics are at least of the second and the third order.

* * * * *

SEQUENCE LISTING

```
<160> NUMBER OF SEQ ID NOS: 12

<210> SEQ ID NO 1
<211> LENGTH: 20
<212> TYPE: DNA
<213> ORGANISM: Artificial Sequence
<220> FEATURE:
<223> OTHER INFORMATION: synthetic oligonucleotide

<400> SEQUENCE: 1
tcgacagtca gccgcatctt                                               20

<210> SEQ ID NO 2
<211> LENGTH: 20
<212> TYPE: DNA
<213> ORGANISM: Artificial Sequence
<220> FEATURE:
<223> OTHER INFORMATION: synthetic oligonucleotide

<400> SEQUENCE: 2
aggcgcccaa tacgaccaaa                                               20

<210> SEQ ID NO 3
<211> LENGTH: 24
<212> TYPE: DNA
<213> ORGANISM: Artificial Sequence
<220> FEATURE:
<223> OTHER INFORMATION: synthetic oligonucleotide

<400> SEQUENCE: 3
ggtttgttct gacttttgt ttct                                           24

<210> SEQ ID NO 4
<211> LENGTH: 27
<212> TYPE: DNA
```

```
<213> ORGANISM: Artificial Sequence
<220> FEATURE:
<223> OTHER INFORMATION: synthetic oligonucleotide

<400> SEQUENCE: 4
tgacacttag gacaatatct atctcta                                           27

<210> SEQ ID NO 5
<211> LENGTH: 24
<212> TYPE: DNA
<213> ORGANISM: Artificial Sequence
<220> FEATURE:
<223> OTHER INFORMATION: synthetic oligonucleotide

<400> SEQUENCE: 5
agttctttct tcagcgtcta catt                                              24

<210> SEQ ID NO 6
<211> LENGTH: 24
<212> TYPE: DNA
<213> ORGANISM: Artificial Sequence
<220> FEATURE:
<223> OTHER INFORMATION: synthetic oligonucleotide

<400> SEQUENCE: 6
tttttccttc attctcctgt tctg                                              24

<210> SEQ ID NO 7
<211> LENGTH: 20
<212> TYPE: DNA
<213> ORGANISM: Artificial Sequence
<220> FEATURE:
<223> OTHER INFORMATION: synthetic oligonucleotide

<400> SEQUENCE: 7
ggaggtcact tggcattcag                                                   20

<210> SEQ ID NO 8
<211> LENGTH: 22
<212> TYPE: DNA
<213> ORGANISM: Artificial Sequence
<220> FEATURE:
<223> OTHER INFORMATION: synthetic oligonucleotide

<400> SEQUENCE: 8
ggaagagaac gaagaaccta cc                                                22

<210> SEQ ID NO 9
<211> LENGTH: 24
<212> TYPE: DNA
<213> ORGANISM: Artificial Sequence
<220> FEATURE:
<223> OTHER INFORMATION: synthetic oligonucleotide

<400> SEQUENCE: 9
accatctctt tacctcctaa ttcc                                              24

<210> SEQ ID NO 10
<211> LENGTH: 22
<212> TYPE: DNA
<213> ORGANISM: Artificial Sequence
<220> FEATURE:
<223> OTHER INFORMATION: synthetic oligonucleotide

<400> SEQUENCE: 10
ctggctctac aatagcactc tc                                                22
```

```
<210> SEQ ID NO 11
<211> LENGTH: 25
<212> TYPE: DNA
<213> ORGANISM: Artificial Sequence
<220> FEATURE:
<223> OTHER INFORMATION: synthetic oligonucleotide

<400> SEQUENCE: 11
aaacagaatt tgtaagttgg cagat                                              25

<210> SEQ ID NO 12
<211> LENGTH: 22
<212> TYPE: DNA
<213> ORGANISM: Artificial Sequence
<220> FEATURE:
<223> OTHER INFORMATION: synthetic oligonucleotide

<400> SEQUENCE: 12
ggtgacattg agatgggtag tg                                                 22
```